United States Patent
Murasugi et al.

(10) Patent No.: US 7,359,784 B2
(45) Date of Patent: Apr. 15, 2008

(54) CONTROL APPARATUS AND CONTROL METHOD FOR AUTOMATIC TRANSMISSION

(75) Inventors: Akio Murasugi, Toyota (JP); Tooru Matsubara, Toyota (JP); Tadayuki Nagai, Toyota (JP); Katsumi Nakatani, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 741 days.

(21) Appl. No.: 10/847,919

(22) Filed: May 19, 2004

(65) Prior Publication Data

US 2004/0249542 A1    Dec. 9, 2004

(30) Foreign Application Priority Data

May 23, 2003   (JP)   ............... 2003-146481

(51) Int. Cl.
*G06F 7/00*   (2006.01)
(52) U.S. Cl. ............... 701/51; 701/55; 701/53
(58) Field of Classification Search ............ 701/1, 701/36, 51, 53, 54, 55, 56, 84, 204
See application file for complete search history.

(56) References Cited

U.S. PATENT DOCUMENTS

| | | | | |
|---|---|---|---|---|
| 5,598,336 A | * | 1/1997 | Kume et al. ................. | 701/51 |
| 5,832,400 A | * | 11/1998 | Takahashi et al. ............ | 701/53 |
| 6,405,120 B1 | * | 6/2002 | Higashimata et al. ......... | 701/96 |
| 6,701,224 B1 | * | 3/2004 | Klusemann ................... | 701/1 |

FOREIGN PATENT DOCUMENTS

| | | |
|---|---|---|
| EP | 0 677 684 | 3/1995 |
| JP | 62-246650 | 10/1987 |
| JP | 3-96755 | 4/1991 |
| JP | 5-71623 | 3/1993 |
| JP | 7-35227 | 2/1995 |
| JP | 7-63256 | 3/1995 |
| JP | 7-71588 | 3/1995 |
| JP | 8-58437 | 3/1996 |
| JP | 8-135782 | 5/1996 |
| JP | 8-136369 | 5/1996 |
| JP | 8-291856 | 11/1996 |
| JP | 10-47121 | 2/1998 |
| JP | 10-213220 | 8/1998 |
| JP | 11-311321 | 11/1999 |

(Continued)

*Primary Examiner*—Richard M. Camby
(74) *Attorney, Agent, or Firm*—Oblon, Spivak, McClelland, Maier & Neustadt, P.C.

(57) ABSTRACT

A control apparatus and a control method for an automatic transmission installed in a vehicle, which detect an inclination of a road on which the vehicle is running; calculate actual torque of an engine installed in the vehicle; store reference torque of the engine; correct an inclination threshold value based on the actual torque and the reference torque and make a determination on whether ascending slope control or descending slope control needs to be performed in the vehicle based on the detected inclination of the road and the corrected inclination threshold value; and control the automatic transmission to perform the ascending slope control or the descending slope control based on the result of the determination. Thus, the control apparatus and the control method make an accurate determination on an ascending slope in a highland area, and accurately perform the ascending slope control or the descending slope control.

36 Claims, 7 Drawing Sheets

FOREIGN PATENT DOCUMENTS

| | | |
|---|---|---|
| JP | 11-325234 | 11/1999 |
| JP | 11-325239 | 11/1999 |
| JP | 2000-74201 | 3/2000 |
| JP | 2000-88091 | 3/2000 |
| JP | 2000-213640 | 8/2000 |
| JP | 2000-314337 | 11/2000 |
| JP | 2000-326761 | 11/2000 |
| JP | 2001-336629 | 12/2001 |
| JP | 2002-39351 | 2/2002 |
| JP | 2002-130467 | 5/2002 |
| JP | 2003-50131 | 2/2003 |

* cited by examiner

FIG. 2

|  | C1 | C2 | C3 | C4 | B1 | B2 | B3 | B4 | F0 | F1 | F2 | F3 |
|---|---|---|---|---|---|---|---|---|---|---|---|---|
| P |  |  |  |  |  |  |  |  |  |  |  |  |
| R |  |  | O |  | ◎ |  |  | O |  | O |  |  |
| N |  |  |  |  |  |  |  |  |  |  |  |  |
| 1th | O |  |  | ◎ |  |  |  | ◎ | O |  |  | O |
| 2nd | O |  |  | ◎ |  | ◎ | O |  | O | O | O |  |
| 3rd | O |  | O | ◎ | ◎ |  | △ |  | O | O |  |  |
| 4th | O | O | △ | ◎ |  |  | △ |  | O |  |  |  |
| 5th | △ | O | O |  | O |  | △ |  |  |  |  |  |
| 6th | △ | O |  |  | △ | O | △ |  |  |  |  |  |

O ENGAGED

◎ ENGAGED WHEN ENGINE BRAKE IS APPLIED

△ ENGAGED BUT ENGAGEMENT IS NOT RELATED TO POWER TRANSMISSION

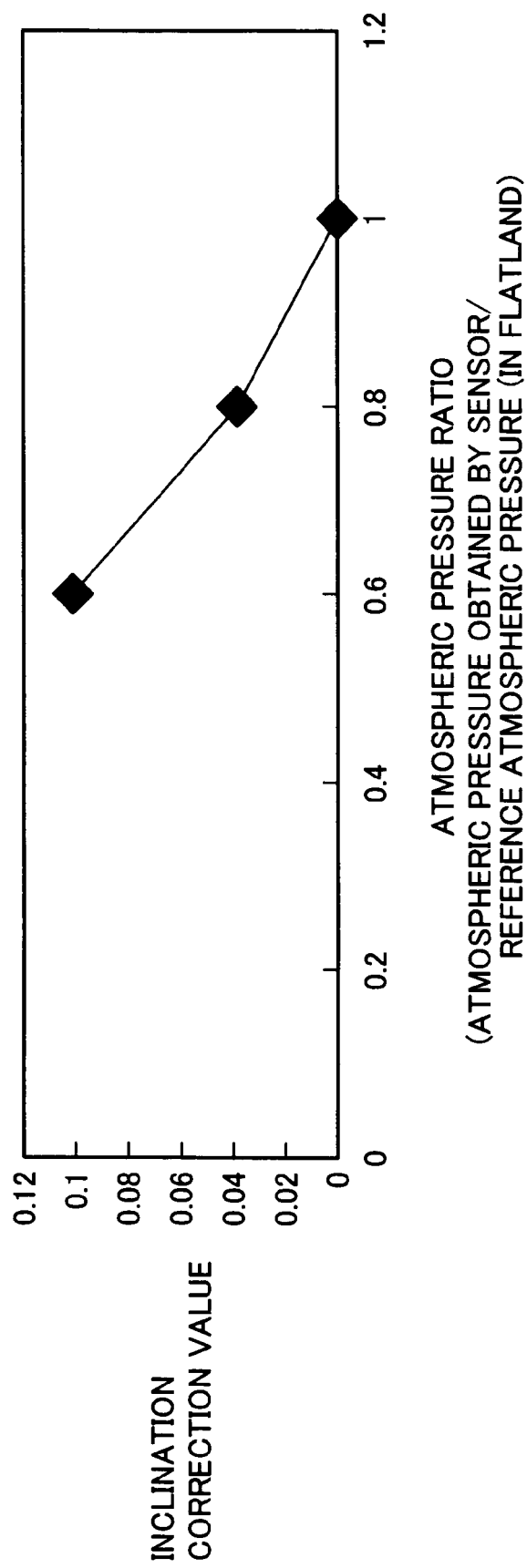

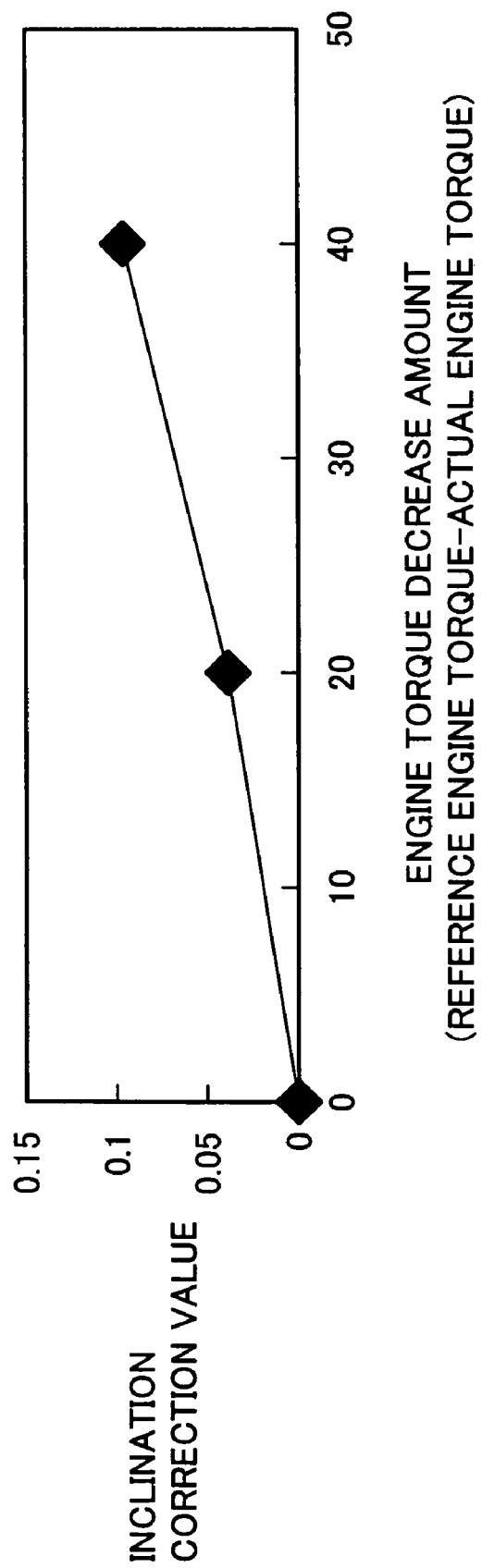

CONTROL APPARATUS AND CONTROL METHOD FOR AUTOMATIC TRANSMISSION

INCORPORATION BY REFERENCE

The disclosure of Japanese Patent Application No. 2003-146481 filed on May 23, 2003 including the specification, drawings and abstract is incorporated herein by reference in its entirety.

BACKGROUND OF THE INVENTION

1. Field of the Invention

The invention relates to a shift control technology for an automatic transmission whose shifting is controlled based on a shift map that is set in advance, and more particularly, to a shift control technology for an automatic transmission in a highland area.

2. Description of the Related Art

In general, a control apparatus for an automatic transmission that is installed in a vehicle determines a shift speed based on two values, that are, a vehicle speed and a throttle opening amount, according to a shift map which is composed of plural upshift lines and downshift lines that are set in advance using the vehicle speed and the throttle opening amount (engine load) as parameters, and automatically changes a shift speed.

Examples of the shift map include a shift map for running in a flat road (hereinafter, referred to as "flat road shift map" or "normal running shift map") which allows the shift speed to be appropriately changed, a shift map for running on a descending slope road (hereinafter, referred to as "descending slope road shift map") in which a shift speed change line is set so as to be on a higher vehicle speed side in a small throttle opening amount region such that a low shift speed region is set to be large as compared with the normal running shift map, and a shift map for running on an ascending slope road (hereinafter, referred to as "ascending slope road shift map") in which a specific shift speed region is set to be large as compared with the normal running shift map. The control apparatus for an automatic transmission detects an inclination of a road surface on which a vehicle is running. When the control apparatus determines that the vehicle is running on a descending slope road based on the result of detection, switches the shift map from the normal running shift map to the descending slope road shift map, and performs shift control based on the descending slope road shift map. Thus, engine brake that is suitable for running on the descending slope road can be applied. Alternatively, when the control apparatus determines that the vehicle is running on an ascending slope road based on the result of detection, the control apparatus switches the shift map from the normal running shift map to the ascending slope road shift map, and performs shift control based on the ascending slope road shift map. Thus, torque that is suitable for running on the ascending slope road can be obtained.

In such a case, in the ascending slope road shift map, a specific shift speed region is set to be large as compared with the normal running shift map. For example, in the case of a vehicle having four shift speeds from first shift speed to fourth shift speed, an upshift line from third speed to fourth speed (hereinafter referred to as "third to fourth upshift line") or the like is moved to a higher vehicle speed side, and a third to second downshift line is moved to a larger throttle opening amount side such that a third speed region becomes larger. Since a driver requires large torque when running on an ascending slope road, the driver does not want to perform upshifting from third speed to fourth speed in most cases, even when a predetermined vehicle speed is achieved, unlike the case of normal running. Therefore, the ascending slope road shift map is set such that upshifting becomes less likely to be performed as compared with the normal running shift map. Also, when running on an ascending slope road, the throttle opening amount becomes relatively large as compared with when running on a flat road, the combination of the vehicle speed and the throttle opening amount is often positioned in the vicinity of the third to second downshift line in the normal running shift map, and downshifting that has not been expected by the driver is performed, which makes the driver uncomfortable. Therefore, the ascending slope road shift map is set such that downshifting becomes less likely to be performed as compared with the normal running shift map.

Meanwhile, in a highland area whose altitude is relatively high, atmospheric pressure is relatively low and an amount of oxygen supplied to an engine is small as compared with a lowland area, and therefore the output of the engine decreases. Accordingly, when running in such a highland area, the throttle opening amount becomes relatively large as compared with when running on a lowland area. In such a case, when running on a flat road in a highland area, shift control may be performed based on the flat road shift map.

However, when running on an ascending slope road in a highland area, shift control is performed based on shift characteristics for running on an ascending slope road in which the third to second downshift line is moved to a larger throttle opening amount side. In the case where shift control is performed based on the shift characteristics, even when the throttle opening amount becomes relatively large, downshifting is less likely to be performed, and the vehicle cannot run forcefully at second shift speed though the driver wants to do so.

Japanese Patent Laid-Open Publication No. 2000-88091 discloses a control apparatus for an automatic transmission which controls downshifting from a specific shift speed according to the altitude of an ascending slope road on which a vehicle is running. The control apparatus performs control according to shift characteristics in which a value concerning a vehicle speed and a value concerning engine load are used as parameters. Examples of the shift characteristics include shift characteristics for running on a flat road, and shift characteristics for running on an ascending slope road in which a predetermined downshift line is moved to a higher engine load side. The control apparatus includes an inclination detection sensor which detects the inclination of a running road, and a shift characteristics switch circuit which switches the shift characteristics from the shift characteristics for running on a flat road to the shift characteristics for running on an ascending slope road when the inclination of the running road that is detected by the inclination detection sensor is equal to or larger than a predetermined inclination. The control apparatus further includes an atmospheric pressure detection sensor which detects atmospheric pressure, and a shift characteristics change circuit which changes a predetermined downshift line in the shift characteristics to a lower engine load side when the atmospheric pressure detected by the atmospheric pressure detection sensor is low, as compared with when the atmospheric pressure is high in the case where the shift characteristics switch circuit selects the shift characteristics for running on an ascending slope road.

In the control apparatus, in the case where the shift characteristics for running on an ascending slope road is selected, the predetermined downshift line is changed to a lower engine load side when the atmospheric pressure detected by the atmospheric pressure detection sensor is low, as compared with when the atmospheric pressure is high. That is, when running on an ascending slope road, shift control is performed based on the shift characteristics for running on an ascending slope road in which the predetermined downshift line is moved to a higher engine load side. When the atmospheric pressure on the ascending slope road is low, the amount of oxygen supplied to the engine decreases and the output of the engine decreases. Therefore, the moved downshift line is changed to a lower engine load side, and then the shift control is performed. Accordingly, when running on the ascending slope road where the atmospheric pressure is low, downshifting from a specific shift speed becomes more likely to be performed. Thus, since the shift control is performed based on the shift map in which the predetermined downshift line is set to be on a smaller throttle opening amount side as compared with the ascending slope road shift map when running on the ascending slope road where the atmospheric pressure is low, predetermined downshifting becomes more likely to be performed, and shifting is performed according to the driver's intention.

The third to second downshift line in the ascending slope road shift map is moved to a larger throttle opening amount side on the assumption that the ascending slope road is in a lowland area. Therefore, when running on an ascending slope road in a highland area where driving force of the engine decreases as compared with a lowland area, downshifting to second shift speed is less likely to be performed, and the driving force continues to be insufficient. In order to solve this problem, in the case of the control apparatus disclosed in Japanese Patent Laid-Open Publication No. 2000-88091, the third to second downshift line is moved to a smaller throttle opening amount side as the detected atmospheric pressure is lower, and shift control is performed based on the corrected shift map.

However, in the case of the control apparatus disclosed in the Japanese Patent Laid-Open Publication No. 2000-88091, the shift line in shift control for an ascending slope road is moved, and then the shift line is corrected so as to correspond to an ascending slope road in a highland area. Particularly, in the case of the control apparatus disclosed in the aforementioned patent document, a road surface inclination θ is calculated according to an equation, (generated driving force calculated based on engine torque−acceleration resistance−air resistance−rolling resistance)/vehicle weight. When running on an ascending slope road whose road surface inclination θ is equal to or larger than a threshold value, the shift line is corrected. At this time, the threshold value is a fixed value, and the Japanese Patent Laid-Open Publication No. 2000-88091 does not disclose a technology in which the shift line is changed according to the altitude.

In a highland area, it is necessary to determine whether a road surface on which the vehicle is running has such a large inclination that control for an ascending slope road (hereinafter referred to as "ascending slope control") needs to be performed, not only in the case of the control apparatus disclosed in the Japanese Patent Laid-Open Publication No. 2000-88091 but also in other cases. Based on this determination, the ascending slope control which changes shift line as disclosed in the Japanese Patent Laid-Open Publication No. 2000-88091, or the ascending slope control which prohibits upshifting is performed. Even in the case where the ascending slope control which prohibits upshifting using a normal shift line is performed, when the determination on an ascending slope road is made based on the road surface inclination calculated according to a running state of the vehicle and a fixed threshold value, there is a possibility that a correct determination cannot be made in a highland area. This is because excess driving force of the engine decreases in a highland area when using a threshold value that is set to be optimal on the assumption that the vehicle runs in a lowland area. As a result, the ascending slope control which prohibits upshifting becomes less likely to be performed in a highland area. Thus, busy shift occurs in which upshifting and downshifting are repeatedly performed, and driveability deteriorates.

SUMMARY OF THE INVENTION

In the view of the above, it is an object of the invention to provide a control apparatus and a control method for an automatic transmission, which can accurately determine whether ascending slope control needs to be performed in a vehicle which is running on an ascending slope road and whether descending slope control needs to be performed in a vehicle which is running on a descending slope road irrespective of altitude, and can perform appropriate ascending slope control or appropriate descending slope control based on the result of the determination.

An aspect of the invention relates to a control apparatus for an automatic transmission installed in a vehicle, which includes an inclination detection device that detects an inclination of a road surface on which the vehicle is running; a calculation device that calculates actual torque of an engine that is installed in the vehicle; a storage device that stores reference torque of the engine; a determination device that corrects an inclination threshold value based on the actual torque and the reference torque, and makes a determination on whether ascending slope control or descending slope control needs to be performed in the vehicle based on the detected inclination of the road surface and the corrected inclination threshold value; and a controller that controls the automatic transmission to perform the ascending slope control or the descending slope control based on a result of the determination made by the determination device.

In the aforementioned control apparatus for an automatic transmission, the determination device makes a determination on whether the ascending slope control or the descending slope control needs to be performed for the automatic transmission. When this determination is made, the inclination threshold value for determining whether the ascending slope control or the descending slope control needs to be started, which is corrected by the determination device, is used. The inclination threshold value is corrected based on the actual torque of the engine and the reference torque. When the vehicle is running in a highland area, the actual torque of the engine is different from the reference torque of the engine that is measured in a bench test performed in a lowland area. Therefore, the inclination threshold value is corrected so as to be decreased based on the actual torque and the reference torque (for example, according to a ratio between the actual torque and the reference torque). In other words, since the atmospheric pressure is relatively low and the amount of oxygen supplied to the engine is small in a highland area as compared with a lowland area, the output of the engine decreases in the highland area. Accordingly, the inclination threshold value is corrected based on the actual torque and the reference torque that is measured in a lowland area, whereby it is accurately determined whether the ascending slope control needs to be started. With this arrangement, for example, the ascending slope control becomes more likely to be started since torque is more likely to be insufficient in a highland area than in a lowland area. As a result, it is possible to provide the control apparatus for an automatic transmission, which can accurately determine whether ascending slope control needs to be performed in a vehicle which is running on an ascending slope road and whether descending slope control needs to be performed in a vehicle which is running on a descending slope road irrespective of altitude, and can perform appropriate ascending slope control or appropriate descending slope control based on the result of the determination.

Another aspect of the invention relates to a control apparatus for an automatic transmission that is installed in a vehicle, which includes an inclination detection device that detects an inclination of a road surface on which the vehicle is running; an atmospheric pressure detection device that detects atmospheric pressure; a storage device that stores reference atmospheric pressure; a determination device that corrects an inclination threshold value based on the detected atmospheric pressure and the reference atmospheric pressure, and makes a determination on whether ascending slope control or descending slope control needs to be performed in the vehicle based on the detected road surface inclination and the corrected inclination threshold value; and a controller that controls the automatic transmission to perform the ascending slope control or the descending slope control based on a result of the determination made by the determination device.

In the aforementioned control apparatus for an automatic transmission, the determination device makes a determination on whether the ascending slope control or the descending slope control needs to be performed. When this determination is made, the inclination threshold value for determining whether the ascending slope control or the descending slope control needs to be started, which is corrected by the determination device, is used. The inclination threshold value is corrected based on the detected atmospheric pressure and the reference atmospheric pressure. Thus, the inclination threshold value is corrected so as to be decreased based on the atmospheric pressure when running in a highland area and the reference atmospheric pressure in a lowland area where a bench test or the like is performed (for example, according to a ratio between the two types of atmospheric pressure). That is, since the atmospheric pressure is low and the amount of oxygen supplied to the engine is small in a high land area, as compared with a lowland area, the output of the engine decreases in the highland area. Accordingly, the inclination threshold value is corrected based on the atmospheric pressure in a highland area and the reference atmospheric pressure in a lowland area. As a result, it is possible to provide the control apparatus for an automatic transmission, which can accurately determine whether ascending slope control needs to be performed in a vehicle which is running on an ascending slope road and whether descending slope control needs to be performed in a vehicle which is running on a descending slope road irrespective of altitude, and can perform appropriate ascending slope control or appropriate descending slope control based on the result of the determination.

A further aspect of the invention relates to a control method for an automatic transmission including a detection step of detecting an inclination of a road on which a vehicle is running; a step of calculating actual torque of an engine installed in the vehicle; a step of storing reference torque of the engine in advance; a correction step of correcting an inclination threshold value based on the actual torque and the reference torque; a determination step of making a determination on whether ascending slope control or descending slope control needs to be performed in the vehicle based on the detected inclination of the road and the corrected inclination threshold value; and a control step of controlling the automatic transmission to perform the ascending slope control or the descending slope control based on a result of the determination.

According to the control method for the automatic transmission, it is determined whether the ascending slope control or the descending slope control needs to be performed for the automatic transmission in the determination step. When this determination is made, the inclination threshold value for determining whether the ascending slope control or the descending slope control needs to be started, which is corrected in the determination step, is used. The inclination threshold value is corrected based on the actual torque of the engine and the reference torque. When the vehicle is running in a highland area, the actual torque is different from the reference torque of the engine that is measured in a bench test performed in a lowland area. Therefore, the inclination threshold value is corrected so as to be decreased based on the actual torque and the reference torque (for example, according to a ratio between the actual torque and the reference torque). In other words, since the atmospheric pressure is relatively low and the amount of oxygen supplied to the engine is small in a highland area as compared with a lowland area, the output of the engine decreases in the highland area. Accordingly, the inclination threshold value is corrected based on the actual torque and the reference torque that is measured in a lowland area, whereby it is accurately determined whether the ascending slope control needs to be started. With this arrangement, for example, the ascending slope control becomes more likely to be started since torque is more likely to be insufficient in a highland area than in a lowland area. As a result, it is possible to provide the control method for an automatic transmission, which can accurately determine whether ascending slope control needs to be performed in a vehicle which is running on an ascending slope road and whether descending slope control needs to be performed in a vehicle which is running on a descending slope road irrespective of altitude, and which can perform appropriate ascending slope control or appropriate descending slope control based on the result of the determination.

A further aspect of the invention relates to a control method for an automatic transmission including a detection step of detecting an inclination of a road on which a vehicle is running; a step of detecting atmospheric pressure; a step of storing reference atmospheric pressure in advance; a correction step of correcting an inclination threshold value based on the detected atmospheric pressure and the reference atmospheric pressure; a determination step of making a determination on whether ascending slope control or descending slope control needs to be performed in the vehicle based on the detected road surface inclination and the corrected inclination threshold value; and a control step of controlling the automatic transmission to perform the ascending slope control or the descending slope control based on a result in the determination step.

According to the control method for the automatic transmission, it is determined whether the ascending slope control or the descending slope control needs to be performed in the determination step. When this determination is made, the inclination threshold value for determining whether the ascending slope control or the descending slope control needs to be started, which is corrected in the determination step, is used. The inclination threshold value is corrected based on the detected atmospheric pressure and the reference atmospheric pressure. Thus, the inclination threshold value is corrected so as to be decreased based on the atmospheric pressure when running in a highland area and the reference atmospheric pressure in a lowland where a bench test or the like is performed (for example, according to a ratio between the two types of atmospheric pressure). That is, since the atmospheric pressure is low and the amount of oxygen supplied to the engine is small in a high land area, as compared with a low land area, the output of the engine decreases in the highland area. Accordingly, the inclination threshold value is corrected based on the atmospheric pressure in a highland area and the reference atmospheric pressure in a lowland area. As a result, it is possible to provide the control method for an automatic transmission, which can accurately determine whether ascending slope control needs to be performed in a vehicle which is running on an ascending slope road and whether descending slope control needs to be performed in a vehicle which is running on a descending slope road irrespective of altitude, and which can perform appropriate ascending slope control or appropriate descending slope control based on the result of the determination.

BRIEF DESCRIPTION OF THE DRAWINGS

The above mentioned and other objects, features, advantages, technical and industrial significance of this invention will be better understood by reading the following detailed description of exemplary embodiments of the invention, when considered in connection with the accompanying drawings, in which:

FIG. 2 is an operation table for the automatic transmission shown in FIG. 1;

FIG. 6 is a graph showing an atmospheric pressure ratio and an inclination correction value; and FIG. 7 is a graph showing an engine torque decrease amount and an inclination correction value.

DETAILED DESCRIPTION OF THE PREFERRED EMBODIMENTS

Figure 1:
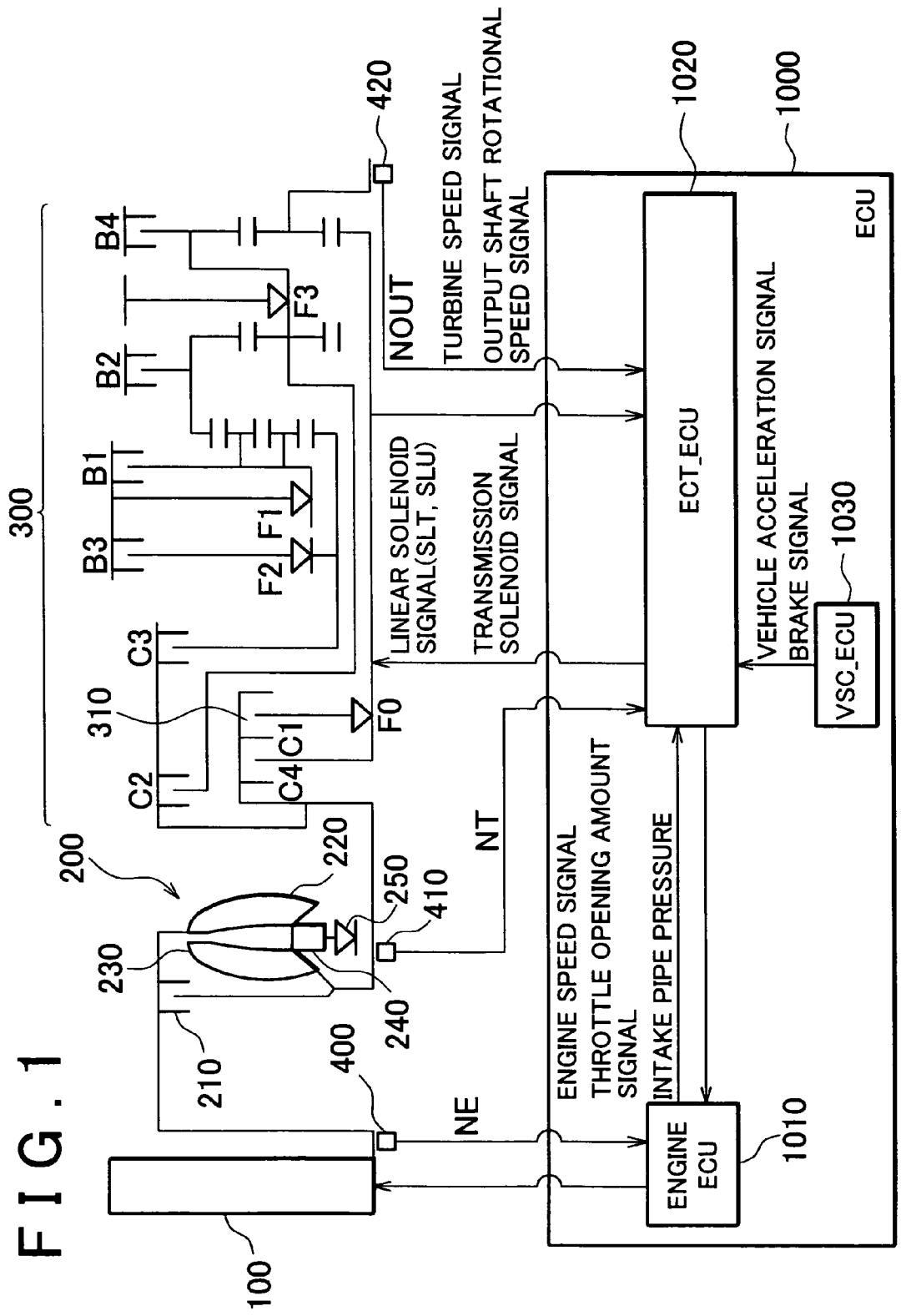
FIG. 1 is a control block diagram of an automatic transmission according to one exemplary embodiment of the invention.

In the following description and the accompanying drawings, the present invention will be described in more detail with reference to exemplary embodiments.

In the following description, the same components are denoted by the same reference numerals. The names and functions thereof are the same. Therefore, detailed description thereof will be omitted.

Hereinafter, a power train of a vehicle including a control apparatus according to an embodiment of the invention will be described. The control apparatus according to the embodiment of the invention is realized as an electronic control unit (hereinafter, referred to as "ECU") 1000. In the embodiment of the invention, the automatic transmission includes a planetary gear type speed changing mechanism connected to a torque converter using fluid.

The invention is not limited to such a configuration, and the automatic transmission may be, for example, a belt type continuously variable transmission.

Referring to FIG. 1, the power train of the vehicle including the control apparatus according to the embodiment of the invention will be described. More particularly, the control apparatus according to the embodiment of the invention is realized as an electronic controlled automatic transmission-ECU (hereinafter, referred to as "ECT-ECU") 1020 in the ECU 1000 shown in FIG. 1.

As shown in FIG. 1, the power train of this vehicle includes an engine 100, a torque converter 200, an automatic transmission 300, and the ECU 1000.

An output shaft of the engine 100 is connected to an input shaft of the torque converter 200. The engine 100 and the torque converter 200 are connected by a rotation shaft. Accordingly, an output shaft rotational speed NE of the engine 100 (i.e., engine speed NE) that is detected by an engine speed sensor 400 is the same as an input shaft rotational speed of the torque converter 200 (i.e., pump rotational speed).

The torque converter 200 includes a lock-up clutch 210 which allows the input shaft and the output shaft to be directly connected; a pump impeller 220 on an input shaft side; a turbine runner 230 on an output shaft side; and a stator 240 which includes a one-way clutch 250, and performs a function of amplifying torque (hereinafter, referred to as "torque amplification function"). The torque converter 200 and the automatic transmission 300 are connected by the rotation shaft. The output shaft rotational speed NT of the torque converter 200 (i.e., turbine speed NT) is detected by a turbine speed sensor 410. An output shaft rotational speed NOUT of the automatic transmission 300 is detected by an output shaft rotational speed sensor 420.

The lock-up clutch 210 is operated by switching between supply and discharge of hydraulic pressure in each of an engagement side and a disengagement side using a lock-up relay valve for supplying the hydraulic pressure. Also, a lock-up piston is placed in contact with, or is separated from a front cover through frictional material by moving the lock-up piston in an axial direction. Also, a space inside the torque converter 200 is divided by the lock-up clutch 210, a disengagement side oil chamber for disengaging the lock-up clutch 210 is formed between the lock-up piston and the front cover, and an engagement side oil chamber for engaging the lock-up clutch 210 is formed between the lock-up piston and the turbine runner. Hydraulic pressure is supplied to the disengagement side oil chamber and the engagement side oil chamber from a hydraulic pressure circuit in a valve body. Control is performed such that the state of the lock-up clutch 210 is switched between the engagement state and the disengagement state. In addition, slip control (flex lock-up control) can be performed in a large vehicle speed region. This slip control will be described later.

FIG. 2 is an operation table for the automatic transmission 300. The operation table in FIG. 2 shows an engagement state and a disengagement state of each of clutch elements that are frictional elements (C1 to C4 in FIG. 2), brake elements that are also frictional elements (B1 to B4), and one-way clutch elements (F0 to F3) at each shift speed. The clutch element (C1) is engaged, and the one-way clutch elements (F0, F3) are engaged at first shift speed that is used when the vehicle takes off.

The ECU 1000 that controls the power train includes an engine ECU 1010 that controls the engine 100, the ECT- ECU 1020 that controls the automatic transmission 300, and a vehicle stability control-ECU (hereinafter, referred to as "VSC-ECU") 1030.

The ECT-ECU 1020 receives a signal indicative of the turbine speed NT from the turbine speed sensor 410, and receives a signal indicative of the output shaft rotational speed NOUT from the output shaft rotational speed sensor 420. The ECT-ECU 1020 receives, from the engine ECU 1010, a signal indicative of the engine speed NE detected by the engine speed sensor 400, a signal indicative of a throttle opening amount detected by a throttle position sensor, and a signal indicative of air pressure (intake pipe pressure) in an intake pipe which delivers intake air to the engine 100.

The ECT-ECU 1020 calculates an intake load rate (i.e., filling efficiency) based on the intake pipe pressure that is input thereto from the engine ECU 1010, and calculates actual torque of the engine 100 based on a map using the intake load rate and the engine speed as parameters. In this case, the intake load rate (i.e., filling efficiency) may be calculated based on mass of air.

The rotational speed sensors described above are provided so as to be opposed to teeth of gears for detecting rotation, which are attached to the input shaft of the torque converter 200, the output shaft of the torque converter 200, and output shaft of the automatic transmission 300. The rotational speed sensors can detect even slight rotation of the input shaft of the torque converter 200, the output shaft of the torque converter 200, and the output shaft of the automatic transmission 300. For example, the rotational speed sensors are generally so called semiconductor sensors using magnetic resistance elements.

Further, the ECT-ECU 1020 receives, from the VSC-ECU 1030, a signal indicative of a vehicle acceleration and a brake signal which indicates that a foot brake is operated by a driver.

The ECT-ECU 1020 outputs control signals to the automatic transmission 300. The control signals include a control signal to a linear solenoid (SLT) for controlling line pressure, a control signal to a linear solenoid (SLU) for performing the slip control (flex lock-up control) of the lock-up clutch 210, and a control signal to a transmission solenoid for achieving shift speeds shown in FIG. 2 that is sent. Based on these solenoid control signals, the line pressure is adjusted, the slip control of the lock-up clutch 210 is performed, and the clutches, brakes, and the one-way clutches of the automatic transmission 300 are engaged and disengaged so that a desired shift speed can be achieved by the planetary gear type speed reducing mechanism.

In the hydraulic pressure circuit that controls the automatic transmission 300, hydraulic oil is supplied to a primary regulator valve from an oil pump by discharge pressure of the oil pump. The primary regulator valve adjusts hydraulic pressure of hydraulic oil to desired line pressure using control hydraulic pressure from the linear solenoid (SLT). The linear solenoid (SLT) is connected to the ECT-ECU 1020, and is controlled by the control signals from the ECT-ECU 1020 (voltage signal, electric current signal).

The ECT-ECU 1020 receives, from the engine ECU 1010, a throttle opening amount, an engine intake amount, an engine coolant temperature, an engine speed NE, and the like of the engine 100. Then, the ECT-ECU 1020 calculates the control signal for the linear solenoid (SLT) based on these values concerning the engine 100, and an input shaft rotational speed of the automatic transmission 300 (for example, the rotational speed detected using the spline of the clutch C2), a hydraulic oil temperature, a shift speed, a position, and the like of the automatic transmission 300.

After the ECT-ECU 1020 calculates the control signal for the linear solenoid (SLT), the primary regulator valve is controlled according to linear characteristics of the linear solenoid (SLT), and the discharge pressure from the oil pump is adjusted to the desired line pressure. As a result, engagement hydraulic pressure for each of the clutches and brakes is controlled by the line pressure, and one-way clutches are controlled. Then, smooth shifting characteristics are achieved. That is, it is possible to perform accurate and meticulous control of the engagement hydraulic pressure for the clutches and the like according to the output of the engine 100 and a running state of the vehicle by monitoring signals from the input shaft rotational speed sensor of the automatic transmission 300 and other various sensors.

On an ascending slope road or a descending slope road in a highland area, the ECT-ECU 1020 that is the control apparatus according to the embodiment of the invention performs control for changing a shift speed by the hydraulic pressure circuit, that is different from control performed on an ascending slope road or a descending slope road in a lowland area or on a flat road in a lowland area and a highland area. For example, in the case of ascending slope control, upshifting is prohibited, and sufficient output shaft torque is generated. In the case of descending slope control, downshifting is facilitated, and sufficient engine brake is generated. Also, in a highland area, engine torque of the engine 100 is likely to be insufficient. Therefore, in order to suppress the load of the oil pump driven by the engine 100, the control signal for the linear solenoid (SLT) is calculated such that the line pressure is decreased.

In the automatic transmission 300, in order to achieve the flex lock-up control, the ECT-ECU 1020 outputs the control signal for the linear solenoid (SLU). The ECT-ECU 1020 performs the slip control (flex lock-up control) of the lock-up clutch 210 even in a low vehicle speed region based on the input rotational speed of the torque converter 200 (engine speed), the output rotational speed of the torque converter 200 (input shaft rotational speed of the automatic transmission 300), and the throttle opening amount, the vehicle speed, and the like of the engine 100. Thus, the transmission efficiency is improved to a large extent.

The hydraulic circuit includes a lock-up relay valve, a lock-up control valve, and a linear solenoid (SLU). The lock-up relay valve switches between an engagement state and a disengagement state of the lock-up clutch 210. The lock-up control valve controls a slip amount of the lock-up clutch by adjusting a pressure difference between the engagement side oil chamber and the disengagement side oil chamber based on a signal pressure for slip control that is output from the linear solenoid (SLU). The linear solenoid (SLU) generates a signal for slip control, which generates engagement pressure for the lock-up clutch 210 such that the slip control can be performed.

The lock-up relay valve includes a disengagement side port which communicates with the disengagement side oil chamber of the lock-up clutch 210; an engagement side port which communicates with the engagement side oil chamber; an input port to which secondary regulator pressure is supplied; a first discharge port through which hydraulic oil in the engagement side oil chamber is discharged when the lock-up clutch 210 is disengaged; and a second discharge port through which hydraulic oil in the disengagement side oil chamber is discharged when the lock-up clutch 210 is engaged.

The lock-up relay valve thus configured has an engagement side position for engaging the lock-up clutch 210 and a disengagement side position for disengaging the lock-up clutch 210. On the engagement side of the lock-up clutch 210, the secondary regulator pressure supplied to the lock-up clutch 210 is supplied to the engagement side oil chamber of the lock-up clutch 210 as engagement hydraulic pressure, that is, ON pressure. On the disengagement side of the lock-up clutch 210, the secondary regulator pressure is supplied to the disengagement side oil chamber as disengagement hydraulic pressure, that is, OFF pressure.

In other words, when the OFF pressure is supplied to the lock-up clutch 210, hydraulic pressure in the disengagement side oil chamber of the lock-up clutch 210 is increased to be higher than the hydraulic pressure in the engagement side oil chamber. Accordingly, the lock-up clutch is disengaged, and at the same time, the hydraulic oil in the engagement side oil chamber is discharged to a drain through the first discharge port and a check valve. Meanwhile, when the ON pressure is supplied to the lock-up clutch 210, the hydraulic pressure in the engagement side oil chamber of the lock-up clutch 210 is increased to be higher than the hydraulic pressure in the disengagement side chamber. Accordingly, the lock-up clutch is engaged, and at the same time, the hydraulic oil in the disengagement side oil chamber is discharged to the drain through the second discharge port and the lock-up control valve.

The linear solenoid (SLU) generates the signal pressure for slip control that increases according to the output voltage from the ECT-ECU 1020, and applies the signal pressure for slip control to the lock-up control valve.

The lock-up control valve includes a line pressure port, a receiving port, and a drain port. The line pressure port is supplied with the secondary regulator pressure. The receiving port receives the hydraulic oil in the disengagement side chamber of the lock-up clutch 210 that is discharged from the second discharge port of the lock-up relay valve. The hydraulic oil received by the receiving port is discharged through the drain port.

Further, the lock-up control valve includes a spool valve, a plunger, a signal pressure oil chamber, two oil chambers, and a spring. The spool valve is provided so as to be movable between a first position which allows the receiving port and the drain port to communicate with each other, and a second position which allows the receiving port and the line pressure port to communicate with each other. The plunger that is provided such that the plunger can contact the spool valve for urging the spool valve toward the first position. The signal pressure oil chamber receives the signal pressure for slip control, which is applied to the plunger and the spool valve such that thrust is given to each of the plunger and the spool valve in a direction in which they move away from each other. One of the two oil chambers receives hydraulic pressure of the hydraulic oil in the disengagement side oil chamber of the lock-up clutch 210, which is applied to the plunger such that thrust toward the first position is given to the plunger, and further to the spool valve. Another oil chamber receives hydraulic pressure of the hydraulic oil in the engagement side oil chamber of the lock-up clutch 210, which is applied to the spool valve such that thrust toward the second position is given to the spool valve. The spring is housed in the signal pressure oil chamber, and urges the spool valve toward the second position.

In the lock-up control valve, when the spool valve is at the first position, the receiving port and the drain port are allowed to communicate with each other, and the hydraulic oil in the disengagement oil chamber of the lock-up clutch 210 is discharged, whereby the pressure difference between the hydraulic pressure of the hydraulic oil in the engagement side oil chamber and the hydraulic pressure of the hydraulic oil in the disengagement side oil chamber of the lock-up clutch 210 is increased. Meanwhile, in the lock-up control valve, when the spool valve is at the second position, the receiving port and the line pressure port are allowed to communicate with each other, and the secondary regulator pressure is supplied into the disengagement side oil chamber of the lock-up clutch 210, whereby the pressure difference between the hydraulic pressure of the hydraulic oil in the engagement side oil chamber and the hydraulic pressure of the hydraulic oil in the disengagement side oil chamber of the lock-up clutch 210 is decreased.

The lock-up control valve adjusts the pressure difference between the engagement side oil chamber and the disengagement side oil chamber based on the signal pressure for slip control which is output from the linear solenoid (SLU) in the aforementioned manner, thereby controlling the slip amount of the lock-up clutch. Thus, slip control of the lock-up clutch 210 is performed. The ECT-ECU performs the slip control (flex lock-up control) of the lock-up clutch 210 in a vehicle speed region that is larger than a normal lock-up region.

On an ascending slope road or a descending slope road in a highland area, the ECT-ECU 1020 that is the control apparatus according to the embodiment of the invention performs engagement/disengagement control or flex lock-up control of the lock-up clutch 210 using the hydraulic circuit, that is different from control performed on an ascending slope road or a descending slope road in a lowland area, or on a flat road in a lowland area or a highland area. For example, in the case of ascending slope control and descending slope control in a highland area, the flex lock-up control is prohibited, and sufficient output shaft torque is generated using the torque amplification function of the torque converter 200 in a highland area where driving force decreases. In the case of the ascending slope control and the descending slope control in a highland area, an engagement region of the lock-up clutch 210 is made smaller such that the lock-up clutch 210 becomes less likely to be engaged, whereby the torque converter 200 performs the torque amplification function.

Figure 3:
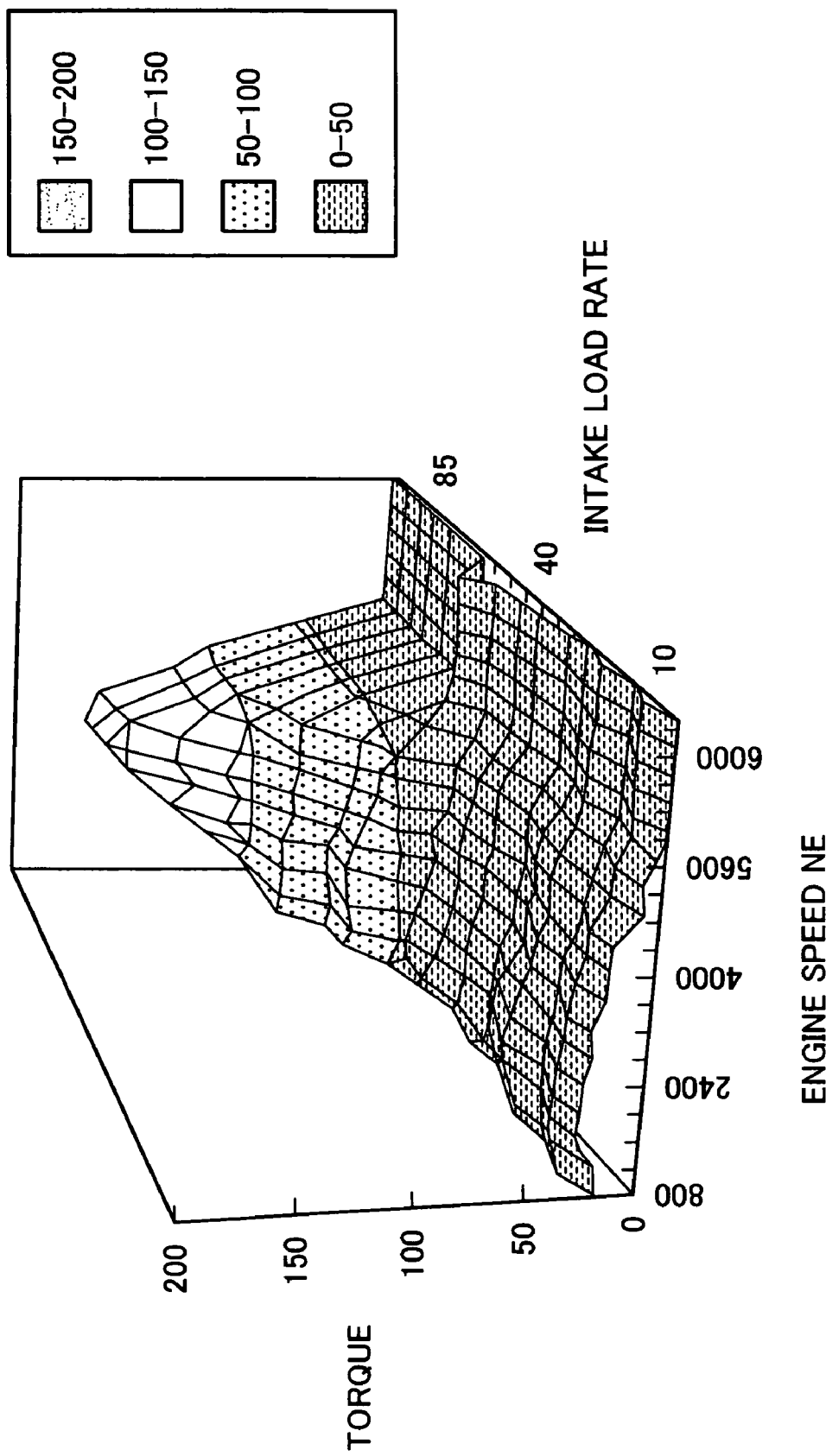
FIG. 3 is a map for calculating engine torque.

Referring to FIG. 3, a three-dimensional map that is stored in memory in the ECT-ECU 1020 will be described. As shown in FIG. 3, the three-dimensional map is used for calculating engine torque using the engine speed NE and the intake load rate as parameters. The ECT-ECU 1020 calculates the engine torque based on the signal indicative of engine speed and the signal indicative of intake pipe pressure, which are input thereto from the engine ECU 1010. At this time, the intake load rate (i.e., filling rate) is calculated based on the intake pipe pressure. The intake load rate (i.e., filling rate) may be calculated based on the mass of air instead of the intake pipe pressure. The three-dimensional map shown in FIG. 3 is exemplary, and the invention is not limited to this map.

Figure 4:
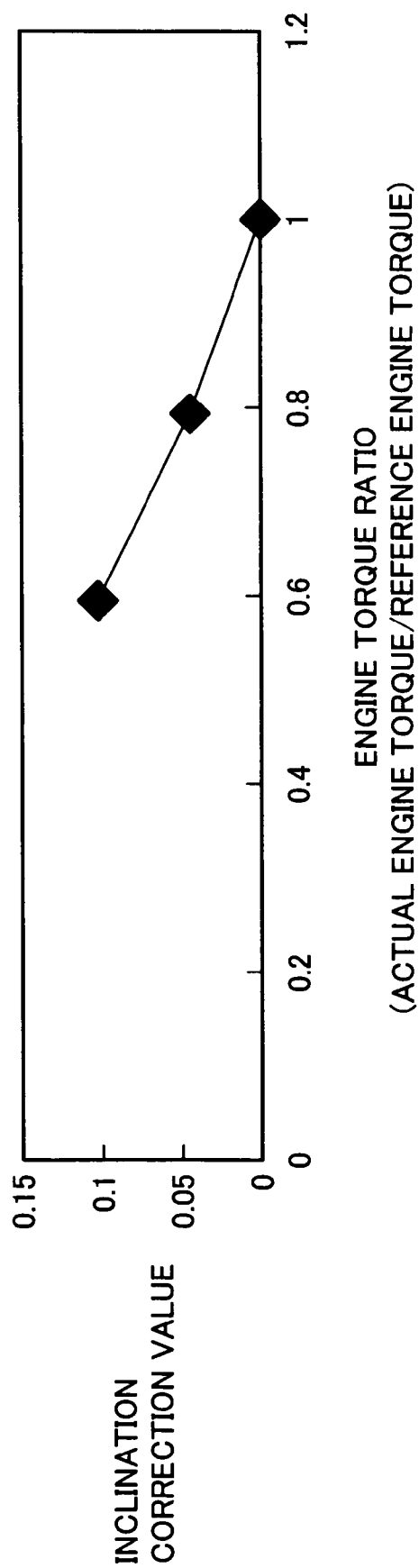
FIG. 4 is a diagram showing a relation between an engine torque ratio and an inclination correction value.

Referring to FIG. 4, a map showing a relation between an engine torque ratio and an inclination correction value, which is stored in memory in the ECT-ECU 1020. As shown in FIG. 4, the horizontal axis shows the engine torque ratio, and the vertical axis shows the inclination correction value. The engine torque ratio is calculated according to an equation, the engine torque ratio=the actual engine torque/the reference engine torque. The reference engine torque is measured by an engine bench test performed in a lowland area, and is stored as a map using the throttle opening amount and the engine speed as parameters, in which a decrease in air density (a decrease in engine torque) in a highland area is not reflected. The actual engine torque is calculated using the aforementioned three-dimensional map shown in FIG. 3. When the ratio between the actual engine torque and the reference engine torque (the actual engine torque/the reference engine torque) is calculated, the inclination correction value increases as the ratio decreases (that is, the actual engine torque decreases), as shown in FIG. 4.

Figure 5:
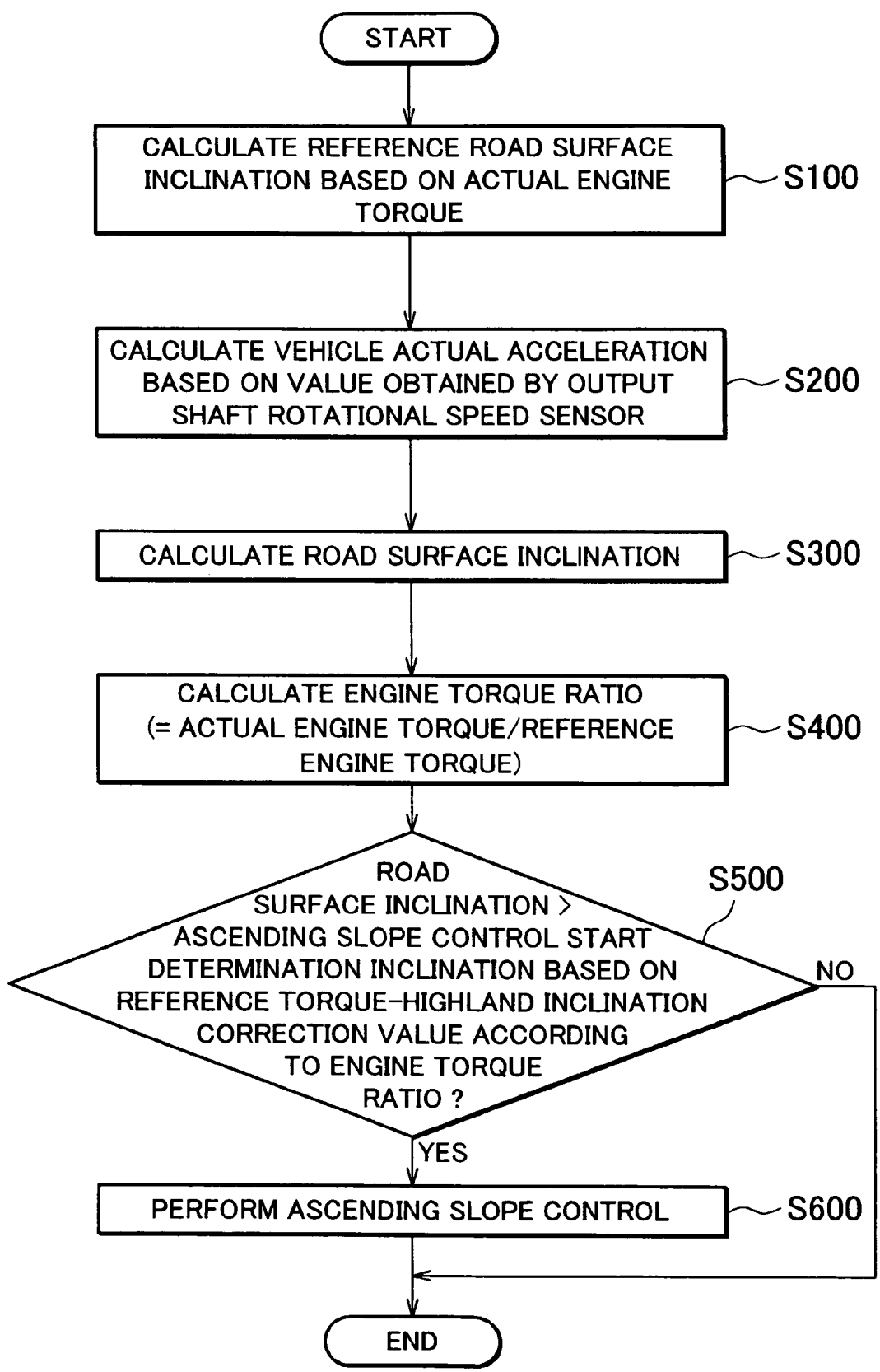
FIG. 5 is a diagram showing a control structure of a program which is performed by an electronic control unit.

Referring to FIG. 5, a control structure of a program performed by the ECT-ECU 1020 that is the control apparatus according to the embodiment of the invention will be described.

In step 100, the ECT-ECU 1020 calculates a reference road surface inclination based on the actual engine torque. The reference road surface inclination (reference acceleration) is calculated based on the actual engine torque as follows. The reference road surface inclination (reference acceleration) is acceleration of the vehicle that is calculated on the assumption that the vehicle were running on a flatland area. As the reference road surface inclination, the acceleration on the assumption that the vehicle were running on a flatland area is calculated based on the actual engine torque.

In step S200, the ECT-ECU 1020 calculates a vehicle actual acceleration based on a value from the output shaft rotational speed sensor 420. The vehicle actual acceleration may be calculated based on a vehicle acceleration signal which is input to the ECT-ECU 1020 from the VSC-ECU 1030. In step S300, the ECT-ECU 1020 calculates a road surface inclination. At this time, the road surface inclination is calculated based on the reference road surface inclination calculated in step S100 and the vehicle actual acceleration calculated in step S200. In this process, the road surface inclination is calculated based on the difference between the reference road surface inclination (reference acceleration) and the vehicle actual acceleration. That is, the road surface inclination is calculated by subtracting the vehicle actual acceleration from the reference road surface inclination (reference acceleration) (i.e., the reference road surface inclination (reference acceleration)—the vehicle actual acceleration).

In step S400, the ECT-ECU 1020 calculates the engine torque ratio. The engine torque ratio is represented by an equation, the actual engine torque/the reference engine torque.

In step 500, the ECT-ECU 1020 determines whether the road surface inclination is larger than a value obtained by subtracting a highland inclination correction value according to the engine torque ratio from a threshold value for determining whether ascending slope control needs to be started (hereinafter, referred to as "ascending slope control start determination inclination") based on the reference torque. At this time, the road surface inclination is a value calculated in step S300. The ascending slope control start determination inclination based on the reference torque is a value stored in advance as the ascending slope control start determination inclination in a flatland area. The highland inclination correction value according to the engine torque ratio is an inclination correction value determined based on the engine torque ratio shown in FIG. 4. When the road surface inclination is larger than the value obtained by subtracting the highland inclination correction value according to the engine torque ratio from the ascending slope control start determination inclination based on the reference torque (i.e., YES in step S500), the process proceeds to step S600. If not (i.e., NO in step S500), the process is finished.

In step S600, the ECT-ECU performs the ascending slope control. Description will be made of an operation of a vehicle including the ECT-ECU 1020 that is the control apparatus according to the embodiment of the invention based on the aforementioned structure and flowchart.

In the vehicle, the ECT-ECU 1020 performs the program represented by the flowchart shown in FIG. 5 at predetermined sampling intervals. When the vehicle reaches an ascending slope road in a highland area, the reference road surface inclination is calculated based on the actual engine torque (S100), and the vehicle actual acceleration is calculated based on the output shaft rotational speed NOUT detected by the output shaft rotational speed sensor 420 (S200). The road surface inclination is calculated by subtracting the vehicle actual acceleration from the reference road surface inclination (S300). The engine torque ratio is calculated using the equation, the actual engine torque ratio/the reference engine torque (S400). When the road surface inclination is larger than the value obtained by subtracting the highland inclination correction value according to the engine torque ratio from the ascending slope control start determination inclination based on the reference torque (i.e., YES in step S500), the ascending slope control is performed (S600).

In such an operation of the vehicle, the actual engine torque is calculated based on the engine speed NE and the intake load rate of the engine 100 according to the three-dimensional map shown in FIG. 3. The highland inclination correction value according to the engine torque ratio is calculated as an inclination correction value corresponding to the engine torque ratio shown in FIG. 4.

As one example of the ascending slope control, the determination on upshifting itself is prohibited, instead of moving the upshift line.

Thus, in the control apparatus according to the embodiment of the invention, the ECT-ECU makes a determination on whether the ascending slope control needs to be performed for the automatic transmission. When this determination is made, the inclination threshold value that is corrected considering the highland inclination correction value according to the engine torque ratio is used, instead of using the ascending slope control start determination inclination based on the reference torque in a flatland area as the threshold value. The inclination threshold value is corrected using the inclination correction value that is calculated based on the ratio between the actual engine torque and the reference engine torque. The corrected inclination threshold value is smaller than the inclination threshold value in a lowland area. In other words, since the atmospheric pressure is relatively low and the amount of oxygen supplied to the engine is small in a highland area as compared with a lowland area, the output of the engine decreases in the highland area. Accordingly, the inclination threshold value is corrected based on the actual engine torque and the reference engine torque that is measured in a lowland area, whereby it can be accurately determined whether the ascending slope control needs to be started. As a result, the ascending slope control becomes more likely to be started since torque is more likely to be insufficient in a highland area than in a lowland area. Thus, driveability on an ascending slope road in a highland area can be improved.

Hereinafter, modified examples of the embodiment of the invention will be described. A map using an atmospheric pressure ratio and an inclination correction value as parameters shown in FIG. 6 may be used instead of the map using the engine torque ratio and the inclination correction value shown in FIG. 4. Also, it is possible to use a map showing a relation between an engine torque decrease amount obtained by subtracting the actual engine torque from the reference engine torque (i.e., the reference engine torque– the actual engine torque) and an inclination correction value as shown in FIG. 7. Further, an inclination correction value may be calculated based on a map showing a relation between an atmospheric pressure decrease amount and an inclination correction value.

Further, in the aforementioned embodiment of the invention, the ascending slope control is performed when the road surface inclination is larger than the value obtained by subtracting the highland inclination correction value according to the engine torque ratio from the ascending slope control start determination inclination based on the reference torque. However, the invention is not limited to this embodiment. Instead of the process in step S500, it may be determined whether the road surface inclination is smaller than the value obtained by subtracting the ascending slope control start determination inclination based on the reference torque from the highland inclination correction value (i.e., −the ascending slope control start determination inclination based on the reference torque+the highland inclination correction value). In this case, if an affirmative determination is made, the descending slope control may be performed instead of the ascending slope control in step S600.

Further, as the ascending slope control, the flex lock-up prohibition control on an ascending slope road in a highland area may be made more likely to be performed. In other words, control which prohibits the flex lock-up is performed on an ascending slope road or a descending slope road in a highland area. This control is performed so that the torque converter 200 is placed in a slip state, the torque amplification function of the torque converter is performed, and driving force is obtained. Accordingly, in a highland area where the driving force of the engine 100 decreases, if the flex lock-up prohibition region is thus made large, the driving force increases.

Further, the torque amount required of the engine 100 may be changed using the highland inclination correction value according to the engine torque ratio. In a highland area, the engine torque decreases with respect to a required throttle amount, a required delay angle, a required idle-up amount, a required accelerator opening amount, a required fuel injection amount, a required closing amount of an acoustic control induction system (ACIS), and the like. Therefore, the engine torque cannot be increased or decreased by a target amount. Accordingly, the required torque amount is corrected using the highland inclination correction value according to the engine torque ratio.

Further, as the ascending slope control, control which moves the upshift line toward the small throttle opening amount side in the high speed region may be performed. With this arrangement, upshifting becomes less likely to be performed, and it is possible to suppress influence of a decrease in engine torque in a highland area.

Further, in the ascending slope control, control may be performed, which increases a disengagement region by changing a lock-up line for the lock-up clutch 210 such that the lock-up clutch 210 becomes less likely to be engaged in order to obtain driving force in a highland area. Similarly to the aforementioned case, since the lock-up clutch 210 is not engaged, the torque amplification function of the torque converter 200 is performed, and it is possible to suppress influence of a decrease in torque of the engine 100 in a highland area.

Further, as the ascending slope control, the line pressure of the hydraulic circuit is set according to the throttle opening amount in general. However, control which decreases the line pressure may be performed in a highland area, since the engine torque decreases in the highland area. Since the load of the oil pump is applied to the engine, it is possible to suppress influence of a decrease in engine torque in a highland area by decreasing the load of oil pump.

Further, it may be determined whether the engine 100 is in a drive state or in a driven state using the highland inclination correction value according to the engine torque ratio. With this arrangement, it is possible to accurately determine whether the engine 100 is in the drive state or in the driven state. In other words, the state of the engine 100 (i.e., the drive state or the driven state) is set at each throttle opening amount and each input rotational speed (turbine speed and engine speed). In the case where the engine torque decreases in a highland area, if the determination on the state of the engine were made based on the throttle opening amount that is set in a lowland area, it would be determined that the engine 100 is in the drive state even when the engine 100 is in the driven state. Therefore, it is determined whether the engine 100 is in the drive state or in the driven state using the highland inclination correction value according to the engine torque, and a drive determination line is moved toward the large throttle opening amount side. With this arrangement, it is possible to accurately determine whether the engine 100 is in the drive state or the driven state, and to accurately perform shift control. Also, in the circuit which detects a failure of the function of the automatic transmission 300, when detecting a failure of a circuit which decides a shift speed ratio based on whether the engine 100 is in the drive state or in the driven state, it is possible to prevent an error in determining whether the engine 100 is in the drive state or in the driven state, and to accurately detect a failure.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A control apparatus for an automatic transmission installed in a vehicle, comprising:
    an inclination detection device that detects an inclination of a road surface on which the vehicle is running;
    a calculation device that calculates actual torque of an engine that is installed in the vehicle;
    a storage device that stores reference torque of the engine;
    a determination device that corrects an inclination threshold value based on the actual torque and the reference torque, and makes a determination on whether ascending slope control or descending slope control needs to be performed in the vehicle based on the detected road surface inclination and the corrected inclination threshold value; and
    a controller that controls the automatic transmission to perform the ascending slope control or the descending slope control based on a result of the determination made by the determination device.

2. The control apparatus for an automatic transmission according to claim 1, wherein the determination device calculates the corrected inclination threshold value based on a reference inclination threshold value for determining whether the ascending slope control or the descending slope control needs to be started, which is set based on the reference torque, and a correction value which is calculated based on the actual torque and the reference torque.

3. The control apparatus for an automatic transmission according to claim 2, wherein the correction value is calculated based on a ratio between the actual torque and the reference torque, or a difference between the actual torque and the reference torque.

4. The control apparatus for an automatic transmission according to claim 1, wherein the inclination detection device calculates, based on the actual torque of the engine, a reference acceleration on an assumption that the vehicle were running in a lowland area, detects an actual acceleration of the vehicle, and detects the inclination of the road surface based on the reference acceleration and the actual acceleration.

5. The control apparatus for an automatic transmission according to claim 1, wherein a G sensor is provided in the inclination detection device and the inclination detection device detects the inclination of the road surface based on a signal detected by the G sensor.

6. The control apparatus for an automatic transmission according to claim 1, wherein the inclination detection device detects the inclination of the road surface based on a signal output from a car navigation system.

7. The control apparatus for an automatic transmission according to claim 1, wherein the controller performs, as the ascending slope control or the descending slope control, at least one of i) control which prohibits or facilitates upshifting or downshifting, ii) control which prohibits flex lock-up control, iii) control which changes a shift line, iv) control which changes a lock-up region, and v) control which changes line pressure.

8. The control apparatus for an automatic transmission according to claim 1, wherein the calculation device calculates torque required of the engine based on a correction value which is used for correcting the inclination threshold value.

9. The control apparatus for an automatic transmission according to claim 1, wherein the determination device determines whether the engine is in a drive state or a driven state based on a correction value which is used for correcting the inclination threshold value.

10. A control apparatus for an automatic transmission installed in a vehicle, comprising:
an inclination detection device that detects an inclination of a road surface on which the vehicle is running;
an atmospheric pressure detection device that detects atmospheric pressure;
a storage device that stores reference atmospheric pressure;
a determination device that corrects an inclination threshold value based on the detected atmospheric pressure and the reference atmospheric pressure, and makes a determination on whether ascending slope control or descending slope control needs to be performed in the vehicle based on the detected road surface inclination and the corrected inclination threshold value; and
a controller that controls the automatic transmission to perform the ascending slope control or the descending slope control based on a result of the determination made by the determination device.

11. The control apparatus for an automatic transmission according to claim 10, wherein the storage device stores reference torque of the engine, and the determination device calculates the corrected inclination threshold value based on a reference inclination threshold value for determining whether the ascending slope control or the descending slope control needs to be started, which is set based on the reference torque, and a correction value which is calculated based on the detected atmospheric pressure and the reference atmospheric pressure.

12. The control apparatus for an automatic transmission according to claim 11, wherein the correction value is calculated based on a ratio between the detected atmospheric pressure and the reference atmospheric pressure, or a difference between the detected atmospheric pressure and the reference atmospheric pressure.

13. The control apparatus for an automatic transmission according to claim 10, wherein the inclination detection device calculates, based on the actual torque of the engine, a reference acceleration on an assumption that the vehicle were running in a lowland area, detects an actual acceleration of the vehicle, and detects the inclination of the road surface based on the reference acceleration and the actual acceleration.

14. The control apparatus for an automatic transmission according to claim 10, wherein a G sensor is provided in the inclination detection device, and the inclination detection device detects the inclination of the road surface based on a signal detected by the G sensor.

15. The control apparatus for an automatic transmission according to claim 10, wherein the inclination detection device detects the inclination of the road surface based on a signal output from a car navigation system.

16. The control apparatus for an automatic transmission according to claim 10, wherein the controller performs, as the ascending slope control or the descending slope control, at least one of i) control which prohibits or facilitates upshifting or downshifting, ii) control which prohibits flex lock-up control, iii) control which changes a shift line, iv) control which changes a lock-up region, and v) control which changes line pressure.

17. The control apparatus for an automatic transmission according to claim 10, wherein the calculation device calculates torque required of the engine based on a correction value which is used for correcting the inclination threshold value.

18. The control apparatus for an automatic transmission according to claim 10, wherein the determination device determines whether the engine is in a drive state or a driven state based on a correction value which is used for correcting the inclination threshold value.

19. A control method for an automatic transmission installed in a vehicle, comprising:
a detection step of detecting an inclination of a road on which the vehicle is running;
a step of calculating actual torque of an engine installed in the vehicle;
a step of storing reference torque of the engine in advance;
a correction step of correcting an inclination threshold value based on the actual torque and the reference torque;
a determination step of making a determination on whether ascending slope control or descending slope control needs to be performed in the vehicle based on the detected inclination of the road and the corrected inclination threshold value; and
a control step of controlling the automatic transmission to perform the ascending slope control or the descending slope control based on a result in the determination step.

20. The control method for an automatic transmission according to claim 19, further comprising the step of calculating the corrected inclination threshold value based on a reference inclination threshold value for determining whether the ascending slope control or the descending slope control needs to be started, which is set based on the reference torque, and a correction value which is calculated based on the actual torque and the reference torque.

21. The control method for an automatic transmission according to claim 20, further comprising the step of calculating the correction value based on a ratio between the actual torque and the reference torque, or a difference between the actual torque and the reference torque.

22. The control method for an automatic transmission according to claim 19, further comprising the steps of:
calculating, based on the actual torque of the engine, a reference acceleration on an assumption that the vehicle were running in a lowland area;
detecting an actual acceleration of the vehicle; and
detecting the inclination of the road surface based on the reference acceleration and the actual acceleration.

23. The control method for an automatic transmission according to claim 19, further comprising the step of detecting the inclination of the road surface based on a signal detected by a G sensor.

24. The control method for an automatic transmission according to claim 19, further comprising the step of detecting the inclination of the road surface based on a signal output from a car navigation system.

25. The control method for an automatic transmission according to claim 19, further comprising the step of performing, as the ascending slope control or the descending slope control, at least one of i) control which prohibits or facilitates upshifting or downshifting, ii) control which prohibits flex lock-up control, iii) control which changes a shift line, iv) control which changes a lock-up region, and v) control which changes line pressure.

26. The control method for an automatic transmission according to claim 19, further comprising the step of calculating torque required of the engine based on a correction value which is used for correcting the inclination threshold value.

27. The control method for an automatic transmission according to claim 19, further comprising the step of determining whether the engine is in a drive state or a driven state based on a correction value which is used for correcting the inclination threshold value.

28. A control method for an automatic transmission installed in a vehicle, comprising:
a detection step of detecting an inclination of a road on which the vehicle is running;
a step of detecting atmospheric pressure;
a step of storing reference atmospheric pressure in advance;
a correction step of correcting an inclination threshold value based on the detected atmospheric pressure and the reference atmospheric pressure;
a determination step of making a determination on whether ascending slope control or descending slope control needs to be performed in the vehicle based on the detected road surface inclination and the corrected inclination threshold value; and
a control step of controlling the automatic transmission to perform the ascending slope control or the descending slope control based on a result in the determination step.

29. The control method for an automatic transmission according to claim 28, further comprising the steps of:
storing reference torque of the engine; and
calculating the corrected inclination threshold value based on a reference inclination threshold value for determining whether the ascending slope control or the descending slope control needs to be started, which is set based on the reference torque, and a correction value which is calculated based on the detected atmospheric pressure and the reference atmospheric pressure.

30. The control method for an automatic transmission according to claim 29, further comprising the step of calculating the correction value based on a ratio between the detected atmospheric pressure and the reference atmospheric pressure, or a difference between the detected atmospheric pressure and the reference atmospheric pressure.

31. The control method for an automatic transmission according to claim 28, further comprising the steps of:
calculating, based on the actual torque of the engine, a reference acceleration on an assumption that the vehicle were running in a lowland area:
detecting an actual acceleration of the vehicle; and
detecting the inclination of the road surface based on the reference acceleration and the actual acceleration.

32. The control method for an automatic transmission according to claim 28, further comprising the step of detecting the inclination of the road surface based on a signal detected by a G sensor.

33. The control method for an automatic transmission according to claim 28, further comprising the step of detecting the inclination of the road surface based on a signal output from a car navigation system.

34. The control method for an automatic transmission according to claim 28, further comprising the step of performing, as the ascending slope control or the descending slope control, at least one of i) control which prohibits or facilitates upshifting or downshifting, ii) control which prohibits flex lock-up control, iii) control which changes a shift line, iv) control which changes a lock-up region, and v) control which changes line pressure.

35. The control method for an automatic transmission according to claim 28, further comprising the step of calculating torque required of the engine based on a correction value which is used for correcting the inclination threshold value.

36. The control method for an automatic transmission according to claim 28, further comprising the step of determining whether the engine is in a drive state or a driven state based on a correction value which is used for correcting the inclination threshold value.

* * * * *